United States Patent Office 2,923,701
Patented Feb. 2, 1960

2,923,701

COMPOSITION COMPRISING A LINEAR COPOLYMER OF A QUATERNARY AMMONIUM COMPOUND AND AN ETHYLENICALLY UNSATURATED COPOLYMERIZABLE COMPOUND

Walter H. Schuller, Stamford, and Walter M. Thomas, Noroton Heights, Conn., assignors to American Cyanamid Company, New York, N.Y., a corporation of Maine No Drawing. Application May 2, 1955
Serial No. 505,514

13 Claims. (Cl. 260—85.5)

This invention relates broadly to new and useful copolymer compositions, and more particularly to compositions comprising a linear copolymer produced by polymerization of a mixture of copolymerizable ingredients including essentially a quaternary ammonium compound containing two and only two unsaturated groupings each having a terminal $CH_2=C<$ radical. Our invention is especially directed to such compositions comprising a linear copolymer obtaned by polymerization of a mixture of copolymerizable ingredients including (1) a quaternary ammonium compound represented by the general formula I
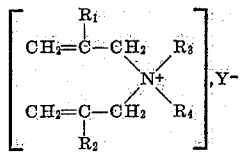

where $R_1$ and $R_2$ each represents a member of the class consisting of hydrogen, and methyl and ethyl radicals, $R_3$ and $R_4$ each represents a member of the class consisting of alkyl, hydroxyalkyl, and alkoxyalkyl radicals having from 1 to 18 carbon atoms, inclusive, and Y— represents an anion and (2) a compound which is different from the compound of (1), that is, different from compounds embraced by the above formula for the compound of (1), is copolymerizable therewith and which contains a single $CH_2=C<$ grouping. The ingredients of (1) and (2) are present in the aforementioned mixture in the ratio of from about 0.1 to about 40 molar percent of the former to from about 99.9 to about 60 molar percent of the latter. The scope of the invention also includes method features.

Illustrative examples of radicals represented by $R_3$ and $R_4$ in Formula I are methyl to octadecyl, inclusive; hydroxymethyl and the various hydroxyethyl to hydroxyoctadecyl, inclusive; and methoxymethyl and the various higher alkoxy (e.g., methoxy to octadecoxy, inclusive) alkyls, e.g., ethyl to octadecyl, inclusive. Illustrative examples of anions represented by Y in Formula I are the halide ions (that is, Y can represent halogen, more particularly chlorine, bromine, fluorine or iodine), sulfate sulfonate, phosphate, hydroxide, borate, cyanide, carbonate, thiocyanate, thiosulfate, isocyanate, sulfite, bisulfite, nitrate, nitrite, oxalate, silicate, sulfide, cyanate, acetate and the other common inorganic and organic ions.

Specific examples of compounds embraced by Formula I are the diallyl, dimethallyl and diethallyl dimethyl, di-(beta-hydroxyethyl) and di-(beta-ethoxyethyl) ammonium chlorides, bromides, phosphates and sulfates. Other examples will be apparent to those skilled in the art from Formula I and from the numerous examples of anions represented by Y and of radicals represented by $R_3$ and $R_4$ that have been given hereinbefore with reference to the said formula.

Quaternary ammonium compounds of the kind embraced by Formula I were known prior to our invention, as was also the fact that one of them, diallyldimethylammonium bromide, could be homopolymerized to yield a water-soluble polymer, or could be copolymerized with triallylmethylammonium bromide or tetraallylammonium bromide to yield a water-insoluble thermoset (cross-linked) copolymer [Butler et al., J. Am. Chem. Soc., 76, 2418 (1954)]. However, to the best of our knowledge and belief it was not known or suggested prior to our invention that linear copolymers having particular and characteristic properties that make them especially valuable for use in industry could be produced by copolymerizing critical molar proportions of diallyldimethylammonium chloride or bromide, or other compound (or mixture of compounds) of the kind embraced by Formula I, with at least one compound which is different therefrom, is copolymerizable therewith and which contains a single $CH_2=C<$ grouping, e.g., styrene, nuclearly substituted monomethyl and dimethyl styrenes, methyl and other lower alkyl acrylates, acrylamide, acrylonitrile, methacrylonitrile, vinyl acetate, etc.

We prefer to use as the comonomer with the unsaturated quaternary ammonium compound a compound which is copolymerizable therewith and which is represented by the general formula II
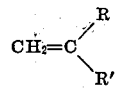

where R represents a member of the class consisting of hydrogen, halogen, and alkyl, cycloalkyl, aryl, alkaryl and aralkyl radicals, and R' represents a radical of the class consisting of aryl and alkaryl radicals and radicals represented by the formulas (a) 

(b) 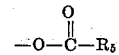

(c) 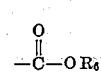

(d) 

(e) 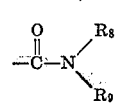

(f) 

where $R_5$ and $R_6$ each represents a radical selected from the class consisting of alkyl, cycloalkyl, and alkoxyalkyl radicals, $R_7$ has the same meaning as $R_5$ and $R_6$ and, in addition, an aryl radical, $R_8$ and $R_9$ each represents a member of the class consisting of hydrogen, and alkyl, cycloalkyl, aryl, alkaryl, aralkyl, and alkoxyalkyl radicals, and $R_{10}$ has the same meaning as $R_5$ and $R_6$.

Any suitable method can be employed in producing the quaternary ammonium compounds used in practicing the present invention. When $R_3$ and $R_4$ in Formula I each represents alkyl or hydroxyalkyl, a suitable method is illustrated by the following equation in which R'' represents an allyl, methallyl or ethallyl radical, and Y represents a halogen, especially chlorine or bromine:

III
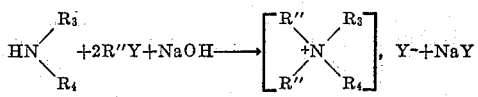

To an aqueous solution of the secondary amine, containing 10 to 50% by weight of amine, is slowly added, under reflux, one equivalent of the alkenyl halide. When $R_3$ and/or $R_4$ are such that

does not readily form a 20% aqueous solution, a sufficient quantity of a suitable solvent (e.g., acetone) may be used to bring the amine into solution. A full equivalent of a concentrated (10–50% by weight) aqueous solution of sodium hydroxide is then added under reflux and while stirring the mass. To the resulting solution, after standing for about 16 hours, are added two further equivalents of the alkenyl halide, and the mixture is refluxed until the reaction is complete, generally about 5 to 15 hours.

The reaction may be considered to be completed when a sample of the reaction mass, after dilution with water, exhibits a pH below 5. The quaternary ammonium salt is obtained directly in aqueous solution in almost a quantitative yield. The excess alkenyl halide is removed from the solution of quaternary ammonium halide by stripping on a steam bath using a water aspirator.

When $R_3$ and $R_4$ each represents an alkoxyalkyl radical, a suitable method is illustrated by the following equation in which $R''$ and $Y$ have the same meanings as given above with reference to Equation III:

IV

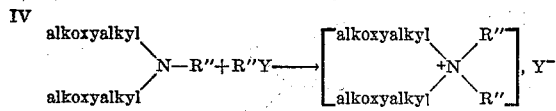

The bis(alkoxyalkyl)allyl (or methallyl or ethallyl) tertiary amine is dissolved in a suitable solvent (e.g., a ketone), an equivalent of an alkenyl halide, especially the chloride or bromide is added, and the mixture is refluxed until the reaction is essentially complete, generally about 1–10 hours. The unsaturated quaternary ammonium salt is isolated, e.g., by filtration, or it may be recovered by evaporation of the solvent. It is obtained in a good yield.

The tertiary amines higher than bis(alkoxymethyl)allyl (or methallyl or ethallyl) tertiary amines used as an intermediate in carrying out the reaction represented by Equation IV can be prepared by a method illustrated by the following equation where $R''$ has the same meaning as given above with reference to Equations III and IV, and $n$ is at least 2:

V

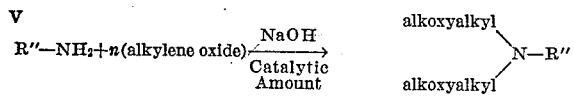

Taking allylamine and ethylene oxide as illustrative of the reactants employed, the above reaction may be illustrated by the following more specific equation:

VI

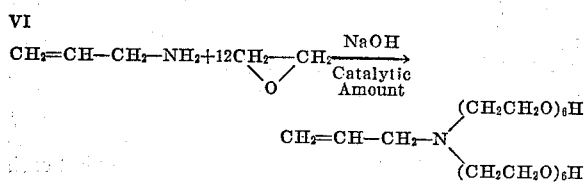

To the allylamine placed in a suitable bomb-type of container is added a catalytic amount of flake sodium hydroxide, and 15 equivalents of ethylene oxide are introduced. After reaction for 3 hours at 100° C. it is found that 12 equivalents of ethylene oxide have reacted as shown in Equation VI based on weight gain potentiometric titrations and infrared studies.

The bis(alkoxymethyl)allyl, methallyl and ethallyl amines that may be used as an intermediate in carrying out the reaction represented by Equation IV can be prepared, for example, by a method illustrated by the following equation, where $R''$ has the same meaning as in Equations III, IV and V, and $R''''$ represents an alkyl radical, e.g., methyl to octadecyl, inclusive:

VII

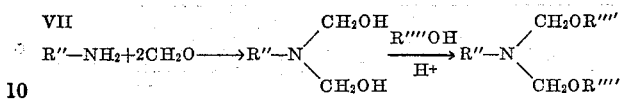

One equivalent of allylamine is added to 2.3 equivalents of formaldehyde as an approximately 37% aqueous solution (formalin). The resulting mixture is warmed to 45° C. for 30 minutes, after which it is allowed to stand at room temperature (about 20°–30° C.) for about 16 hours. The product is obtained as amorphous solid upon distilling off the volatile matter under reduced pressure.

The dimethylolallylamine produced as described above is charged to a flask containing, as a minimum, 10 equivalents of the desired alcohol and preferably more. If the alcohol is a liquid, no solvent need be employed; if a solid, a suitable inert solvent may be used. In all cases, the alcohol and the solvent employed must be dry. An acidic catalyst, e.g., oxalic acid, dry hydrogen chloride gas, or the like is then added to the reaction mixture, and the mass is heated with stirring for 2–50 hours at from 50° to 105° C. The product is obtained by vacuum stripping of the reaction mass.

Other organic and inorganic salts can be prepared from the unsaturated quaternary ammonium halides produced by methods such as those described above. Thus the quaternary ammonium halide, e.g., diallyldialkylammonium chloride or bromide, can be dissolved in the minimum quantity of n-butanol, after which 1.5 equivalents of sodium n-butoxide in the minimum quantity of n-butanol is added. After stirring and allowing to stand for about 16 hours, the precipitated sodium halide is filtered off. The resulting solution of quaternary ammonium n-butoxide, specifically diallyldialkylammonium n-butoxide, can be used directly (anion, —OR), or reacted with one equivalent of water (anion, —OH), or with one equivalent of various acids, e.g., sulfuric acid (anion, $HSO_4$—), phosphoric acid (anion, $H_2PO_7$—), etc.

The present invention is based on our discovery that compositions comprising new and useful linear copolymers can be produced by polymerization of a mixture of particular molar proportions of a quaternary ammonium compound of the kind embraced by Formula I and a compound which is different therefrom, is copolymerizable therewith and which contains a single $CH_2$=C< grouping. The comonomer which is copolymerizable with the quaternary ammonium compound is preferably one which is represented by Formula II. The molar percentages of quaternary ammonium compound and comonomer which is copolymerized therewith may be considerably varied within the range of from about 0.1 to about 40 molar percent, e.g., from 0.5–2 to 20–30 molar percent, of the quaternary ammonium compound to from about 99.9 to about 60 molar percent of the comonomer containing a single $CH_2$=C< grouping, e.g., from 98–99.5 to 70–80 molar percent of the said $CH_2$=C< compound. The copolymerization reaction may be carried out in any suitable manner, but preferably is effected while the mixture of copolymerizable ingredients is dissolved or dispersed in an aqueous medium and with the aid of a polymerization catalyst, after which the linear copolymer that is formed is isolated, if desired, from the aqueous mass; or, in those cases where the copolymer is formed in solution, the solution of the copolymer in certain cases may be used directly as such without isolation of the copolymer from the aqueous mass.

It was quite surprising and unexpected that a quaternary ammonium compound containing two unsaturated groupings having a terminal $CH_2=C<$ radical could be copolymerized with another compound containing a single $CH_2=C<$ grouping to yield a linear copolymer, since ordinarily it would be expected that such a quaternary ammonium compound when copolymerized with a compound containing a single $CH_2=C<$ grouping would yield a cross-linked copolymer. The reason for this mono-functionality of a quaternary ammonium compound of the kind embraced by Formula I is not fully understood.

Surprisingly, it was also discovered that the presence of the second ethylenically unsaturated grouping (allyl, methallyl or ethallyl radical) on the quaternary ammonium nitrogen atom apparently increases the susceptibility of the first ethylenically unsaturated grouping to copolymerization with a compound containing a single $CH_2=C<$ grouping. For example, when diallyldimethylammonium chloride is copolymerized with acrylonitrile within the percentage proportions hereinbefore given, a copolymer is obtained that contains about twice as much quaternary ammonium nitrogen as when, for example, monoallyltrimethylammonium chloride or monoallyltriethylammonium bromide is used. It was also surprisingly and unexpectedly found that when dimethallyldimethylammonium chloride is copolymerized with acrylonitrile the resulting copolymer, although obtained in a somewhat lower yield, contains about six times as much combined quaternary ammonium nitrogen salt as would have been obtained if monoallyltrimethylammonium chloride or monoallyltriethylammonium bromide had been employed. These comparisons are based on a direct titration for the quaternary ammonium grouping.

The properties of the copolymers obtained by practicing our invention are quite unusual and in no way could have been predicted from the properties of the monomers employed in their preparation or from knowledge of the properties of simple homopolymers produced from the individual monomers. For example, the copolymerization of diallyldimethylammonium chloride with styrene within the range of molar percentages given hereinbefore yielded an emulsion of great stability when the copolymerization reaction was carried out in an aqueous medium.

Other characteristic properties of our new linear copolymers make them eminently suitable for use in industry in applications where the simple homopolymers thereof, as well as other types of copolymers, would be entirely unsuited. For example, the copolymers of a minor molar percentage of a quaternary ammonium compound of the kind embraced by Formula I and a major molar percentage of acrylonitrile (e.g., at least 80 mole percent of combined acrylonitrile) yield a fiber-forming linear copolymer which is more receptive to dyes, especially acid dyes, than the homopolymer of acrylonitrile and many of the fiber-forming copolymers of acrylonitrile. Copolymers of acrylamide and quaternary ammonium compounds of the kind used in practicing our invention also have very valuable properties. For example, such copolymers can be used as textile-treating agents, e.g., in rendering wool-containing fabrics resistant to felting and shrinking, as core binders, in adhesive and laminating compositions, as thickening agents, in the photographic arts and for many other purposes.

The linear copolymers of this invention also may be used as intermediates in the preparation of other synthetic compositions. For example, the acrylamide copolymers having at least one hydrogen atom attached to the amino nitrogen atom can be reacted with an aldehyde, e.g., formaldehyde, to yield a new class of thermosetting or potentially thermosetting resinous compositions. Or, thermosetting or potentially thermosetting compositions also may be produced from any of the linear copolymers of our invention by cross-linking the linear copolymer through the residual allyl (or methallyl or ethallyl grouping), for instance, by copolymerization with a suitable cross-linking agent, e.g., diallyl phthalate, at an elevated temperature and with the aid of a polymerization catalyst.

Polymerization catalysts which are suitable for use in polymerizing compounds containing an ethylenically unsaturated grouping, specifically a vinyl grouping, are usually suitable for use in producing the new linear copolymers of the present invention. Catalysts which are especially suitable for use in practicing this invention are the water-soluble peroxy catalysts, preferably a water-soluble salt of persulfuric (perdisulfuric) acid, which salt is preferably used in combination with a sulfoxy type of reducing agent. Other examples of polymerization catalysts which are useful in practicing the present invention include the inorganic and organic peroxides, e.g., the diacyl peroxides, the primary, secondary and tertiary alkyl peroxides and hydroperoxides and esters thereof, the various water-soluble peracetates, perchlorates, percarbonates, perborates, perphosphates, e.g., the ammonium and alkali-metal salts of peracetic, percarbonic, perboric, perphosphoric, persulfuric, perchloric, etc., acids; and water-soluble ferric salts capable of yielding ferric ions, including the various ferric alums, e.g., ferric ammonium sulfate, ferric sodium sulfate, etc.

Such water-soluble catalysts as mentioned above by way of example are generally employed in combination with a water-soluble activator of the catalyst, for instance, oxygen-containing, sulfur-containing compounds that are capable of undergoing oxidation. Illustrative examples of such activators or adjuvants include sulfur dioxide, the alkali-metal (e.g., sodium, potassium, etc.) bisulfites, hydrosulfites, thiosulfates, sulfurous acid (or compounds which engender sulfurous acid, e.g., alkali-metal sulfites, ethyl and other alkyl sulfites, etc.), various organic sulfinic acids, e.g., p-toluene sulfinic acid, formamidine sulfinic acid, etc. If alkali-metal sulfites, e.g., sodium sulfite, or similar compounds which engender sulfurous acid are used, the aqueous solution also should contain a strong acid, e.g., sulfuric acid, etc., in an amount which is at least chemically equivalent to the amount of such a compound engendering sulfurous acid that is employed.

Various other "free radical" types of catalysts can be used to accelerate polymerization, e.g., alpha,alpha'-azodiisobutyronitrile. Illustrative examples of other catalysts that can be employed are given in, for instance, U.S. Patent No. 2,656,339.

The concentration of the catalyst is relatively small, e.g., from, by weight, about 1 part of catalyst per 1000 parts of the monomeric mixture to about 4 or 5 parts of catalyst per 100 parts of the mixture of monomers. The amount of polymerization adjuvant or activator used likewise may be varied considerably, but generally is within the range of from about 0.1 to 1 molar proportion based on the catalyst used or an amount which is chemically equivalent to the amount of catalyst employed. The use of higher ratios of activator with respect to the catalyst is not precluded, e.g., 2 or 3 or more moles of activator per mole of catalyst, or correspondingly larger proportions on a chemical equivalent basis, but no particular advantages ordinarily accrue therefrom.

The mixture of monomers can be polymerized in emulsion or solution state to yield a linear copolymer. Good results are obtained by effecting copolymerization while the monomers are dissolved in a suitable solvent, preferably water or liquid solvent comprising mainly water. Suitable inert organic solvents also can be used advantageously in some cases, e.g., benzene, toluene, xylene, various ketones, etc. The polymerization reaction advantageously is conducted under a blanket of an inert gas, e.g., nitrogen gas.

The temperature at which the monomers are copolymerized can be considerably varied, but in most cases the polymerization temperature will be within the range of about 20°–30° C., preferably at least 35° or 40° C., up to the boiling temperature of the mixture of monomers, depending, for example, upon the particular catalyst, if any, used, the rapidity of polymerization wanted and other influencing factors.

The polymerization can be carried out continuously, semi-continuously or by batch operations. It can be effected under superatmospheric pressure if desired or required.

In order that those skilled in the art may better understand how the present invention can be carried into effect, the following examples are given by way of illustration and not by way of limitation. In all cases the parts and percentages are by weight unless otherwise stated. The 36% aqueous solution of diallyldimethylammonium chloride ("DADM") used in many of the examples in all cases contains about 13% by weight of sodium chloride unless otherwise stated. The copolymerization reactions in all cases are carried out in a reaction vessel which has been swept with nitrogen gas, and a steady flow of nitrogen gas is passed through the unit during the polymerization period in the manner more specifically described in some of the examples.

EXAMPLE 1

*Preparation of diallyldimethylammonium chloride ("DADM")*

VIII

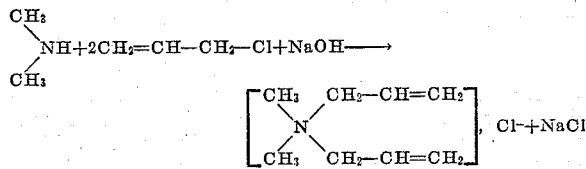

To a 12-liter, 3-necked flask fitted with a thermometer, a stirrer, a Dry-Ice condenser, and a dropping funnel is added 1125 g. (10.0 moles) of a 40% aqueous solution of dimethylamine. Allyl chloride (750 g.; 9.8 moles) is added dropwise with vigorous stirring at a rate limited by the vigorousness of the reflux due to the exothermic nature of the reaction. The addition requires about 1 hour. By the end of this period the temperature is found to rise to 57° C. The dropping funnel is next filled with a solution of 400 g. of sodium hydroxide in 400 g. of water, and addition thereof is carried out dropwise with stirring. All the alkali solution is added in 1 hour's time, the reflux temperature remaining at 57° C. After standing for about 16 hours, 1545 g. (20.2 moles) of allyl chloride is added slowly, during stirring, through the dropping funnel. The addition requires about 1½ hours, and reflux is maintained by gentle heating on a steam bath. The solution is subsequently refluxed for 6½ hours at 46° C. during which time the acidity of the solution drops to pH 5.

A sample of the reaction mixture, adjusted to pH>10 with aqueous sodium hydroxide, does not liberate any volatile amine on boiling, as indicated by a test with moist red litmus paper. This indicates that all of the dimethylamine has been quaternarized. The reaction mixture is stripped in vacuo on a water pump to remove excess allyl chloride and then diluted with water to a solution containing 36% diallyldimethylammonium chloride and 13% sodium chloride by weight.

The diluted solution is treated with finely divided decolorizing carbon for about 16 hours, after which the carbon is removed by filtration, and an aliquot of the pale yellow solution is titrated potentiometrically with standard acid. The absence of secondary and tertiary amines is established in this manner. The decolorized solution exhibits an iodine number of 113 c.g.s. I$_2$/g. and a total solids content of 48.5%. On the basis of these determinations, the solution contains, by weight, about 36.0% diallyldimethylammonium chloride and about 12.5% sodium chloride.

EXAMPLE 2

*Preparation of dimethallyldimethylammonium chloride ("DMADM")*

|  | Parts | Approx. Molar Ratio |
|---|---|---|
| 40% aqueous solution of dimethylamine | 112.8 | 1 |
| Methallyl chloride | 271.5 | 3 |
| Sodium hydroxide (dissolved in 80 parts of water) | 40.0 | 1 |

The aqueous solution of the dimethylamine is placed in a 3-necked reaction vessel equipped with a Dry-Ice condenser, thermometer, stirrer and dropping funnels. The methallyl chloride is then introduced slowly until ½ of it has been added. The aqueous solution of sodium hydroxide is next added, followed by the addition of the remainder of the methallyl chloride. The resulting mixture is heated under reflux at the boiling temperature of the mass for 2 days on a steam bath. At the end of this period of time the reaction mass has separated into three phases, two of which are liquid and the third a solid. The solid is sodium chloride. The aqueous layer contains mostly dissolved sodium chloride. Upon cooling to room temperature the organic phase has crystals of the desired product precipitated therein. A yield of dimethallyldimethylammonium chloride corresponding to about 80% of the theoretical is obtained. Analysis of the crystalline product shows that it contains no sodium. Analysis for nitrogen shows 7.3% N; theoretical equals 7.2% N.

EXAMPLE 3

*Copolymer of acrylamide and "DADM"*

A 1-liter, 3-necked flask is equipped with a thermometer, mechanical stirrer, gas-inlet tube, reflux condenser, and three dropping funnels. In the first funnel is placed a solution of 68 g. (92.8 mole percent) of acrylamide and 34 g. of a 36% aqueous solution of DADM (7.2 mole percent), containing 13% sodium chloride by weight, in 120 g. of water. In the second funnel is placed a solution of 0.4 g. of ammonium persulfate in 100 g. of water and in the third funnel, a solution of 0.2 g. of potassium meta-bisulfite in 100 g. of water. One-quarter of the solution of reactants and one-quarter of the total volume of each of the catalyst solutions are added simultaneously to the reaction flask from the dropping funnels. Prior to the addition, the flask is swept with nitrogen gas through the gas-inlet tube for approximately 30 minutes. A steady flow of nitrogen gas is kept running through the reaction set-up during the polymerization.

A definite exotherm is noted upon mixing the monomer and catalyst solutions as described above. The temperature rises to 54° C. but is reduced to 40° C. by external cooling. The reaction flask is immersed in a constant-temperature bath set at 40° C. before the start of the copolymerization and the reaction temperature is held at 40° C. for the major part of the copolymerization. Over the course of the next 70 minutes, the remaining 75% of the reactants and catalyst is added in increments of approximately 10% of the total starting quantities. A slight exotherm to 42°–45° C. is noted after each addition. The reaction mixture is heated for 3½ hours at 40° C. after the last addition has been made.

The product, containing 20% "active solids" (salt-free linear copolymer of acrylamide and diallyldimethylammonium chloride), is a viscous solution. It is diluted to 10% solids by the addition of 400 g. of water. The final homogeneous solution has a pH of 4.5 and a Brookfield viscosity of 178 cps. at 25° C. The iodine number of this material is 2.6 c.g.s. of iodine per g. of sample.

A determination by polarographic techniques of free (unreacted) acrylamide monomer present in the copolymer solution indicates that the total unsaturation less the acrylic unsaturation is equal to one equivalent of allylic double bond for every equivalent of quaternary ammonium nitrogen salt originally charged. As the product is a free-flowing solution and contains no cross-linked material visible to the naked eye, the composition of the copolymer properly may be considered to be essentially the same as the charge composition.

To 80 g. of the above 10% solids solution of the acrylamide-DADM linear copolymer is added 80 g. of water, and the resulting solution is adjusted to pH 10 by the addition of a few drops of 2.3 N sodium hydroxide. To this solution is added 10.5 g. of formalin (approximately 37% aqueous formaldehyde solution), previously adjusted to pH 10, and the resulting mixture is heated for 1 hour at 50° C., after which hydrochloric acid is added in an amount sufficient to lower the pH to 7.

A piece of woolen goods is immersed in the above solution. The treated wool is passed through squeeze rolls, after which it is framed, air-dried for a short period, and then heated for 9 minutes at 290° F. After cooling to room temperature, the sample is removed from the frame, allowed to remain undisturbed for about 16 hours, and is then measured prior to laundering. The method of laundering is a modification of the standard method of the A.A.T.T.C., and involves heating for 20–30 minutes at 240° F. while drying after each washing. After a cycle of 5 washing (10 minutes in soap solution) and drying operations, the dried, treated cloth shows a shrinkage of only 5.5%. After 5 cycles of washing and drying operations and a washing of 1 hour in soap solution after each cycle, the dried, treated cloth shows a shrinkage of only 8.7%. In marked contrast, untreated woolen cloth after 5 washing cycles of 10 minutes each followed by 60 minutes' washing shows a shrinkage of 45%.

EXAMPLE 4

Copolymer of acrylamide and DADM

The apparatus used and procedure followed are, in general, the same as that described in Example 3. The first dropping funnel contains 68 g. (92.8 mole percent) of acrylamide, 34 g. of a 36% aqueous solution of DADM (7.2 mole percent), and 60 g. of water; the second funnel, 0.2 g. of ammonium persulfate in 40 g. of water; and the third, 0.1 g. of potassium metabisulfite in 40 g. of water. The solution of reactants in the first funnel is adjusted to pH 2.5 with a few drops of 6 N $H_2SO_4$. Approximately 10% of each of the catalyst solutions and 10% of the aqueous monomeric mixture are added to the reaction flask at the start. An immediate exotherm to 52° C. is observed.

The reaction flask is immersed in a constant-temperature bath set at 35° C. and, for the most part, the polymerization is carried out at this temperature. The remaining 90% of the catalyst and reactants are added over a period of 1 hour in approximately nine equal portions. The reaction mass becomes too thick to stir several times, and 50 g. of water is added at two different times. A final dilution to 20% solids is made following the last addition of catalysts and reactants by the introduction of 60 g. of water. This mixture is heated for 4 hours at 40° C.

At the end of this period, 400 g. of water is added to yield a solution containing 10% active solids (salt-free linear copolymer of acrylamide and diallyldimethylammonium chloride). This solution exhibits a pH of 2, and a Brookfield viscosity of 40,000 c.p.s. The iodine number is found to be 6.6 c.g.s. of iodine per g. of sample. It is useful as a textile-treating composition or as a component of such compositions. For instance, it can be employed in treating wool-containing fabrics and other textiles to impart shrinkage resistance thereto as described under Example 3 with reference to the formaldehyde-reaction product of that example.

EXAMPLE 5

Copolymer of acrylamide and DADM

The apparatus and procedure used are essentially the same as that described in Example 3. The first dropping funnel contains 90 g. (95.5 mole percent) of acrylamide and 28 g. of a 36% solution of DADM (4.5 mole percent), in 102 g. of water. The second funnel contains 0.13 g. of ammonium persulfate in 40 g. of water and the third contains 0.065 g. of potassium meta-bisulfite in 40 g. of water. The solution in the first funnel is adjusted to pH 2.5 by the addition of a few drops of 6 N sulfuric acid. Approximately 25% of each of the catalyst solutions and 25% of the aqueous monomeric mixture are added simultaneously to the reaction flask. An immediate exotherm to 48° C. is observed. A stiff gel forms in the flask and cannot be stirred. The gel is dissolved in 200 ml. of added water, and the copolymerization is continued with the addition of the remaining 75% of the reactants and catalysts in seven equal portions over a 45-minute period. The temperature of the reaction mixture is held between 38°–42° C. during the addition. A subsequent heating period of 3 hours' duration at 40° C. is also carried out. The resulting viscous solution is diluted to 10% active solids by the addition of 500 ml. of water. This solution exhibits a pH of 2 and a Brookfield viscosity of 70,000 c.p.s. The iodine number is 2.9 g. of iodine per g. of solution. A determination of free acrylamide in the copolymer solution by polarographic techniques indicates that the linear copolymer contains, by weight, 92.5% acrylamide and 7.5% diallyldimethylammonium chloride combined in the copolymer molecule, which corresponds to 96.6 mole percent acrylamide and 3.4 mole percent diallyldimethylammonium chloride.

The aqueous copolymer solutions of this example, or solutions of their formaldehyde-reaction products, are useful as, for instance, core binders, components of adhesive and laminating compositions, sealing agents, thickeners, etc.

EXAMPLE 6

Copolymer of acrylamide and DADM

The apparatus used is essentially the same as that described in Example 3 but a slightly different procedure is followed. To the reaction flask is added 69.4 g. of a 36% aqueous solution of diallyldimethylammonium chloride (about 13 mole percent), containing 13% sodium chloride plus 55 g. of water, and the resulting solution is adjusted to pH 2.5 with 6 N sulfuric acid. To the first funnel is added a solution of 75 g. (about 87 mole percent) of acrylamide in 200 g. of water; to the second, 0.09 g. of ammonium persulfate in 50 g. of water; and to the third, 0.045 g. of potassium meta-bisulfite in 50 g. of water. The constant-temperature bath surrounding the reaction flask is set at 40° C. About 10% each of the catalyst solutions and of the acrylamide solution are added simultaneously to the reaction flask. No exotherm is noted. Over the course of the next 50 minutes a total of 70% of the catalyst and acrylamide solutions is added with no apparent increase in the temperature or viscosity of the reaction mixture. With the addition of the final 30% of the solutions in the dropping funnels, an exotherm is noticed with the temperature rising to 55° C. The solution becomes progressively more viscous during the 4-hour heating period at 40° C. which follows.

The reaction mass is diluted to 10% active solids (salt-free linear copolymer of acrylamide and DADM) by the addition of 500 g. of water. The resulting solution exhibits a pH of 2 and a Brookfield viscosity of 14,000 cps. The results of determinations of iodine number and polarographic measurements for free acrylamide show that the linear copolymer contains, by weight, 79.7% acrylamide and 20.3% diallyldimethylammonium chloride combined in the copolymer molecule, which corresponds to about 90 mole percent of the former and about 10 mole percent of the latter.

The copolymer solutions of this example can be reacted with formaldehyde (as described in Example 3 but proportionately increasing the amount of HCHO corresponding to the increased amount of acrylamide combined in the copolymer molecule) to yield thermosetting compositions that are useful as adhesives, laminating and coating compositions, etc., or as components of such compositions.

For the acrylamide used in Examples 3, 4, 5 and 6, one can substitute an equivalent amount of another monomer (or mixture of monomers in any proportions) which is different from DADM, is copolymerizable therewith and which contains a $CH_2=C<$ grouping, more particularly a compound (or mixture of compounds) of the kind embraced by Formula II, e.g., methacrylamide, ethacrylamide, cyclopentylacrylamide, phenylacrylamide, tolylacrylamide, benzylacrylamide, and the various mono- and di-N-substituted acrylamides, including the mono- and di-N-alkyl, -cycloalkyl, -aryl, -alkaryl, -aralkyl and -alkoxyalkyl acrylamides. In some cases it may be desirable to carry out the reaction in a mixture of water and an organic solvent, for instance a 1:1 volume mixture of water and acetone when preparing a copolymer of DADM and, for example, N-tertiary-butylacrylamide.

For the DADM of Examples 3, 4, 5 and 6, one can substitute an equivalent amount of any other quaternary ammonium compound of the kind embraced by Formula I, e.g., diallyldimethylammonium bromide, dimethallyldimethylammonium chloride, diethallyldiethylammonium dihydrogen sulfate, diallyldi(beta-hydroxyethyl)ammonium chloride, dimethallyldi(methoxymethyl)ammonium bromide, etc.

EXAMPLE 7

*Copolymer of acrylonitrile and DADM*

The apparatus used is essentially the same as that described in Example 3 with the exception that only two dropping funnels are employed. To the flask is added 98.5 g. of 96.9% acrylonitrile (96.5 mole percent), 29.4 g. of a 36% aqueous solution of diallyldimethylammonium chloride (3.5 mole percent), and 800 g. of water. The solution is adjusted to pH 2 by the addition of 5.0 ml. of 3 N $HNO_3$, and then 140 g. of water is added. To the first funnel is added a solution of 0.44 g. of sodium chlorate and 3.15 g. of disodium sulfite heptahydrate dissolved in 100 g. of water. To the second funnel is added 6.2 ml. of 3 N $HNO_3$ and 94 ml. of water. As usual, the reaction set-up is swept with a stream of nitrogen for 30 minutes prior to the start of the copolymerization, and the reaction is carried out under a nitrogen stream. The constant-temperature bath is set at 40° C. A 40-ml. addition is made from each funnel during vigorous stirring. After a few minutes, a white solid is observed precipitating from solution. The remainder of each of the solutions in the dropping funnels is added in six portions over a 2½-hour period, followed by a 2-hour heating period at 40° C. The linear copolymer of acrylonitrile and diallyldimethylammonium chloride that forms is filtered from the reaction mass, washed with 2 liters of water, and dried at 75° C. The dried copolymer weighs 75 g. (70.8% conversion). From the results of an analysis for total nitrogen it is calculated that the linear copolymer contains, by weight, about 96% acrylonitrile and about 4% diallyldimethylammonium chloride combined in the copolymer molecule, which corresponds to 98.8 mole percent of the former and 1.2 mole percent of the latter.

One-half gram of dried copolymer is dissolved in 50 ml. of dimethyl formamide to yield a perfectly clear solution without any indication of insoluble gel being present. This would indicate a lack of cross-linked material in the copolymer. The viscosity molecular weight in 40% aqueous sodium thiocyanate solution is 116,000. A sample of the dried copolymer weighing approximately 1 g. is dispersed in a mixture containing 10 ml. of a 10% solution of sodium sulfate, 10 ml. of a 2% aqueous solution of sulfuric acid, 10 ml. of a 2% aqueous solution of Calcocid Alizarine Blue SAPG (Color Index No. 1054), and 90 ml. of water. The dispersion is boiled for 40 minutes, then filtered by suction, and the solid is washed with hot water until the filtrate is colorless. The copolymer is found to be dyed a deep blue, indicating that a substantial quantity of quaternary ammonium salt has been incorporated in the copolymer. Homopolymeric acrylonitrile, when similarly treated, is colorless or nearly so.

EXAMPLE 8

*Copolymer of acrylonitrile and DADM*

The apparatus used is the same as that employed in Example 3. The flask is swept with nitrogen gas through the gas-inlet tube for approximately 30 minutes, after which it is charged with 139 g. of a 36% aqueous solution of DADM (about 10 mole percent), 73 g. of 97% acrylonitrile (about 42 mole percent), 10 ml. of 3 N nitric acid and 1540 ml. of water. To funnel A is added a solution of 1.3 g. of sodium chlorate and 4.67 g. of sodium sulfite in 100 ml. of water. To funnel B is added 25 ml. of 3 N nitric acid and 75 ml. of water. To funnel C is added 82 g. of 97% acylonitrile (about 48 mole percent). The contents of the three dropping funnels are discharged at equal rates in five portions, into the reaction mixture, over a 2-hour period. Vigorous stirring of the reaction mixture is carried out. The temperature is maintained at 40° C. and a steady flow of nitrogen gas is kept running through the reaction set-up during the entire polymerization. After an additional hour of stirring at 40° C. the product is filtered off, washed and dried. From an analysis based on a direct titration for quaternary ammonium nitrogen, it is calculated that the linear copolymer of acrylonitrile and diallyldimethylammonium chloride contains, by weight, 97.7% of the former and 2.3% of the latter combined in the copolymer molecule.

EXAMPLE 9

*Ternary polymer of acrylonitrile, methyl acrylate and DADM*

The apparatus and procedure are essentially the same as that employed in Example 3 except that only two dropping funnels are used. The flask is charged with 27.8 g. of a 36% aqueous solution of DADM (about 1.7 mole percent), 10 g. of methyl acrylate (about 3.3 mole percent), 186 g. of 97% acrylonitrile (about 95 mole percent), 1500 g. of water and 23 ml. of 3 N nitric acid. Funnel A is charged with a solution of 1.3 g. of sodium chlorate and 4.67 g. of sodium sulfite in 100 ml. of water; funnel B is charged with 25 ml. of 3 N nitric acid and 75 ml. of water. The contents of both funnels are added, as usual, over a 2-hour period while stirring and maintaining the temperature at 40° C. After an additional hour of stirring at 40° C., the product is filtered off, washed and dried. From an analysis based on a direct titration for quaternary ammonium nitrogen, it is calculated that the dried, linear, ternary polymer contains, by weight, 94.4% acrylonitrile, 5.0% methyl acrylate and 0.6% diallyldimethylammonium chloride combined in the polymer molecule.

In place of the acrylonitrile employed in Examples 7, 8 and 9, one can use an equivalent amount of other comonomers of the kind embraced by Formula II, e.g., chloroacrylonitrile (alpha-chloroacrylonitrile), methacrylonitrile (alpha-methacrylonitrile), ethacrylonitrile, etc. Also, one can use, for instance, an equivalent amount of dimethallyldimethyl- or -diethylammonium chloride, bromide or other quaternary ammonium organic or inorganic salt of the kind embraced by Formula I in place of DADM.

EXAMPLE 10

*Production of a fiber from the ternary polymer of Example 9*

The ternary polymer of acrylonitrile, methylacrylate and DADM of Example 9 is dissolved in a concentrated aqueous solution of sodium thiocyanate (about 50% NaSCN in water) in proportions such as will yield a spinning solution containing about 9.4% ternary polymer. This solution is filtered, placed under vacuum and allowed to deaerate for about 72 hours.

The aforementioned spinning solution is formed into a fiber by extruding it through a spinneret, having 40 holes, each 90 microns in diameter, into a coagulating bath comprising water maintained at a temperature of about 0° C. The spun fiber in gel state is continuously passed over a pair of converging wash rolls while it is advancing in a helical path. The fiber is rinsed with water on the rolls to remove excess thiocyanate. The washed fiber is stretched about 900% while passing through a bath of hot water maintained at a temperature of about 99.5° C., and then is taken up on a bobbin where it is kept in a gelled state by applying a fine spray of water while the fiber is being collected on the bobbin. The dried fiber has a sticking temperature of 274° C., and good acid and alkali resistance.

A 5-gram swatch of the above-described fiber (sample A) and a 5-gram swatch of a fiber similarly made from homopolymeric acrylonitrile (sample B) are immersed in a dye bath consisting of 500 parts of an aqueous solution containing 0.2 part of concentrated sulfuric acid, 1 part of sodium sulfate and 0.2 part of Calcocid Alizarine Blue SAPG (Color Index No. 1054). The dye bath is boiled for 30 minutes, after which the swatches are removed and washed with hot water until the water is free of dye. The sample A swatch is dyed a very deep blue color while the sample B swatch is undyed.

In a manner essentially the same as that described in this example with reference to the production of a fiber from the ternary polymer of Example 9, fibers can be made from the copolymers of Examples 7 and 8.

EXAMPLE 11

*Copolymer of acrylamide and DADM*

A linear copolymer is prepared from 97 parts acrylamide (98.6 mole percent) and 3 parts DADM (1.4 mole percent) in a manner essentially the same as that described in Example 6. The resulting copolymer solution is diluted to 10% solids. A viscosity measurement of the diluted solution is off the scale of the Brookfield viscosimeter on the high side, and thus is over 100,000 cps. The 10% solution is almost gelatinous while cold but fluid when heated. It is useful, for instance, in preventing sedimentation of finely divided materials, e.g., silver halides; in preparing compositions that can be employed as vehicles for the preparation of light-sensitive emulsions; or in applications where other soluble polyelectrolytes are commonly employed.

EXAMPLE 12

*Copolymers of styrene and DADM*

(A) To 27 g. of a 36% aqueous solution of DADM (about 39 mole percent) is added 9.7 g. (about 61 mole percent) of styrene, 200 g. of water, 0.5 g. of sodium lauryl sulfate and 3 g. of 3% hydrogen peroxide. This mixture is well shaken and heated for 3 hours at 65° C. It is observed on the following day that some rubbery, linear copolymer is present which is water-insoluble. This copolymer, alone or admixed with various effect agents (e.g., dyes, pigments, fillers, curing catalysts, etc.), can be used as a molding composition from which a wide variety of molded articles for industrial and household use can be produced by molding under heat and pressure.

(B) To 139 parts of a 36% aqueous solution of DADM (39 mole percent) is added 14.3 parts of a 35% solution of stearamidopropyl-beta-hydroxyethylammonium chloride (wetting agent) and 200 parts of water. The solution is adjusted to pH 4.5 with dilute sodium hydroxide. This mixture is contained in a 3-necked flask equipped with a stirrer, three dropping funnels, a thermometer, a reflux condenser, and a gas-inlet tube. The system is swept with nitrogen for 1½ hours. Funnel I is charged with 1 part of ammonium persulfate and 50 parts of water. Funnel II is charged with ½ part of potassium meta-bisulfite and 50 parts of water. Funnel III is charged with 50 parts of styrene (about 61 mole percent). The contents of the three dropping funnels are added simultaneously and at equal rates over a 1-hour period with vigorous stirring. The pot temperature is maintained at 43° C. Stirring is continued for 2 additional hours at a temperature of 43° C., after which any unpolymerized styrene is removed by steam distillation. A free-flowing copolymer emulsion is obtained which exhibits exceptional stability. The emulsion of the linear copolymer of styrene and diallyldimethyl ammonium chloride is not broken by the addition of alum or sodium sulfate, by boiling, heating for 1 hour, or freezing in a Dry-Ice bath for 2 hours. Upon evaporation to dryness and redissolution of the residue in water, the copolymer emulsion is again obtained.

The remarkable and unexpected stability of this emulsion makes it eminently suitable for use as a component of wall paints, adhesives, and coating and/or impregnating compositions. This copolymeric emulsion or latex also can be employed directly for the preparation of various sheets, coatings and elastomeric articles.

Instead of styrene employed in this example, one can use an equivalent amount of, for example, para-methyl styrene, alpha, para-dimethyl styrene, any of the nuclearly substituted dialkyl styrenes, the various chloro- and cyano-substituted styrenes, vinyl naphthalene and other compounds which are different from DADM, are copolymerizable therewith and contain a single $CH_2=C<$ grouping.

EXAMPLE 13

*Copolymer of methyl acrylate and DADM*

To 27 g. of a 36% aqueous solution of DADM (about 35 mole percent) is added 9.7 g. (about 65 mole percent of methyl acrylate, 300 g. of water, 0.2 g. of sodium chlorate, 1.4 g. of sodium sulfite heptahydrate, and the homogeneous solution is adjusted to pH 2 by the addition of a few ml. of 3 N nitric acid. The solution is heated at 65° C. for 3 hours. A quantity of rubbery, water-insoluble linear copolymer of methyl acrylate and diallyldimethylammonium chloride forms during this time. It is filtered off, washed with water and dried to a constant weight. This copolymer can be used, for instance, as a component of various finishes and sizes (e.g., textile sizes, leather-finishing compositions, etc.), as a modifier of other synthetic resins, as a component of printing pastes, as an intermediate in producing other synthetic materials, and for other purposes.

Instead of methyl acrylate employed in this example, one can use an equivalent amount of any of the other alkyl acrylates and methacrylates, especially the lower alkyl acrylates and methacrylates, e.g., ethyl, propyl, butyl and amyl acrylates, and the methyl to amyl, inclusive, methacrylates; also, the corresponding alpha-chloro acrylates.

EXAMPLE 14

*Copolymer of methyl isopropenyl ketone and DADM*

To 27 g. of a 36% aqueous solution of DADM (about 34 mole percent) is added 9.7 g. (about 66 mole percent) of methyl isopropenyl ketone, 300 g. of water, 0.2 g. of sodium chlorate, 1.4 g. of sodium sulfite heptahydrate, and the homogeneous solution is adjusted to pH 2 with 3 N nitric acid. The mixture is heated at 65° C. for 3 hours. The next day it is observed that a small quantity of a white, linear copolymer of methyl isopropenyl ketone and diallyldimethylammonium chloride precipitates from solution. This copolymer is filtered off, washed and dried to a constant weight. It can be used, for example, as a drilling mud additive to concrete, as an intermediate from which thermosetting resinous compositions can be produced, etc.

Instead of methyl isopropenyl ketone employed in this example, one can use an equivalent of, for example, methyl, ethyl, propyl or isobutyl vinyl ketone, phenyl vinyl ketone or ethyl isopropenyl ketone; or any of the vinyl alkyl ethers, e.g., methyl, ethyl, isopropyl, n-butyl, isobutyl or 2-ethylhexyl vinyl ether.

EXAMPLE 15

*Copolymer of vinyl acetate and DADM*

To 27 g. of a 36% aqueous solution of DADM (about 35 mole percent) is added 9.7 g. (about 65 mole percent) of vinyl acetate, 200 g. of water, 3.0 g. of a 35% solution of stearamidopropyl-beta-hydroxyethylammonium chloride (wetting agent), 0.5 g. of sodium lauryl sulfate, 0.2 g. of ammonium persulfate, 0.1 g. of potassium meta-bisulfite, and the mixture, after vigorous shaking, is adjusted to pH 2 with 3 N nitric acid. The cloudy emulsion is heated with occasional shaking for 3 hours at 65° C. On the following day it is noted that addition of the reaction mixture to water yields a quanity of a white, rubbery, water-insoluble, linear copolymer of vinyl acetate and diallyldimethyl ammonium chloride. The copolymer is filtered off, washed with water and dried at room temperature to a constant weight. It can be used, for example, as an adhesive composition or as a component of such compositions.

Instead of vinyl acetate employed in this example, one can use an equivalent amount of, for example, vinyl propionate, butyrate, isobutyrate, or laurate.

EXAMPLE 16

*Copolymer of methyl acrylate and dimethallyldimethylammonium chloride ("DMADM")*

Approximately 30 g. (about 16 mole percent) of DMADM is dissolved in 292 g. (about 84 mole percent) of methyl acrylate, 15 g. of 3% hydrogen peroxide solution and 8 g. of a 70% solution of cumene hydroperoxide added, and the homogeneous solution is heated at 90° C. for 2 hours. The very viscous linear copylmer of methyl acrylate and dimethallyldimethylammonium chloride that forms can be dissolved in methyl ethyl ketone and reprecipitated with benzene. It can be isolated by filtration, and used in such applications as given under Example 13 with reference to the copolymer of that example.

EXAMPLE 17

*Ternary polymer of acrylonitrile, vinyl acetate and DMADM*

To a reaction vessel equipped in the usual manner are added 90.1 parts (about 94 mole percent) of acrylonitrile, 10.6 parts (about 3 mole percent) of DMADM, 5.3 parts (about 3 mole percent) of vinyl acetate, 10.6 parts of sodium nitrate and 950 parts of demineralized water. The solution is purged with nitrogen for a half-hour. The flow is then reduced to 2–3 bubbles per second. A redox catalyst system consisting of 0.88 part of sodium chlorate and 3.15 parts of sodium sulfite dissolved in 100 parts of water, and a second solution consisting of 2.27 parts of 100% nitric acid dissolved in 98 parts of water, are prepared. These solutions are added stepwise to the flask at intermittent intervals over a period of 2.5 hours. The polymerization is continued for an additional 1.5 hours. The product is collected on a Büchner funnel, washed with 2000 parts of demineralized water and dried to constant weight in an oven at 70° C. Twenty-five parts of a dry, white, linear, ternary polymer of acrylonitrile, dimethallyldimethylammonium chloride and vinyl acetate is obtained. Analysis indicates the presence of 4.92% of dimethallyldimethylammonium chloride combined in the ternary polymer.

A synthetic fiber is produced from the ternary polymer of this example in essentially the same manner described under Example 9 with reference to the production of a fiber from the ternary polymer of Example 8. It has excellent dyeing characteristics, especially toward acid dyes.

EXAMPLE 18

*Preparation of ternary polymer of acrylamide, acrylic acid and DADM*

Into a three-necked reaction vessel equipped with two dropping funnels, thermometer, stirrer and an inlet for the introduction of nitrogen gas is charged a mixture of 1 part of DADM in 57 parts of water. The system is purged for 1 hour with prepurified nitrogen gas. One dropping funnel is charged with a mixture of 3 parts of acrylic acid and 11.6 parts of acrylamide which has been neutralized to a pH of 7 with a base, and 34 parts of water. The other funnel is charged with an aqueous solution of 0.475 part of ammonium persulfate dissolved in 47.7 parts of water. Equal portions of the contents of each of the dropping funnels are added to the reaction vessel every 5 minutes over a period of ½ hour, at the end of which time the last addition has been made. The temperature of the reaction mass is maintained at 70°–80° C. throughout the reaction period. The flow of nitrogen gas through the system is continued during the entire reaction period. After the contents of the two dropping funnels has all been added to the reaction vessel, the reaction is permitted to continue for an additional 3½ hours. The resulting aqueous solution of a ternary polymer of acrylamide, acrylic acid and diallyldimethylammonium chloride has a Brookfield viscosity of 200 cps. It is suitable for such uses as described under Examples 3–6 with reference to the copolymers of those examples.

We claim:

1. A composition comprising a linear copolymer which is the product of polymerization of a mixture of copolymerizable ingredients including (1) a single quaternary ammonium compound represented by the general formula

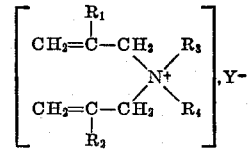

where $R_1$ and $R_2$ each represents a member of the class consisting of hydrogen, and methyl and ethyl radicals, $R_3$ and $R_4$ each represents a member of the class consisting of alkyl, hydroxyalkyl, and alkoxyalkyl radicals having from 1 to 18 carbon atoms, inclusive, and $Y^-$ represents an anion, said compound of (1) being the only quaternary ammonium copolymerizable ingredient which is present in the aforesaid mixture, and (2) a compound which is copolymerizable with the compound of (1) and which contains a single $CH_2=C<$ grouping, the ingredients of (1) and (2) being present in the aforementioned mixture in the ratio of from 0.1 to 40 molar percent of the former to from 99.9 to 60 molar percent of the latter.

2. A composition as in claim 1 wherein the single quaternary ammonium compound of (1) is diallyldimethylammonium chloride.

3. A composition as in claim 1 wherein the single quaternary ammonium compound of (1) is dimethallyldimethylammonium chloride.

4. A composition as in claim 1 wherein the compound of (2) is a monovinyl compound.

5. A composition as in claim 4 wherein the monovinyl compound of (2) is a monovinyl aliphatic compound.

6. A composition as in claim 5 wherein the monovinyl aliphatic compound is acrylonitrile.

7. A composition as in claim 5 wherein the monovinyl aliphatic compound is acrylamide.

8. A composition as in claim 5 wherein the monovinyl aliphatic compound is a monovinyl ester.

9. A composition as in claim 8 wherein the monovinyl ester is vinyl acetate.

10. A composition as in claim 4 wherein the monovinyl compound of (2) is a monovinyl aromatic compound.

11. A composition as in claim 10 wherein the monovinyl aromatic compound is styrene.

12. A composition comprising a linear copolymer which is the product of polymerization of a mixture of copolymerizable ingredients including (1) a quaternary ammonium compound represented by the general formula

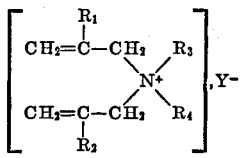

where $R_1$ and $R_2$ each represents a member of the class consisting of hydrogen, and methyl and ethyl radicals, $R_3$ and $R_4$ each represents a member of the class consisting of alkyl, hydroxyalkyl, and alkoxyalkyl radicals having from 1 to 18 carbon atoms, inclusive, and $Y^-$ represents an anion, said compound of (1) being the only quaternary ammonium copolymerizable ingredient which is present in the aforesaid mixture, and (2) a compound which is copolymerizable with the compound of (1) and which is represented by the general formula

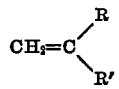

where R represents a member of the class consisting of hydrogen, halogen, and alkyl, cycloalkyl, aryl, alkaryl and aralkyl radicals, and R' represents a radical of the class consisting of aryl and alkaryl radicals and radicals represented by the formulas

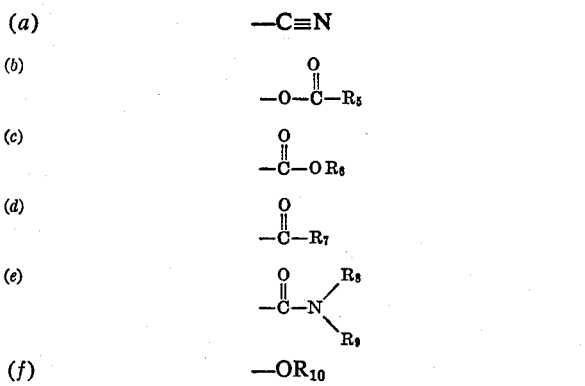

where $R_5$ and $R_6$ each represents a radical selected from the class consisting of alkyl, cycloalkyl, and alkoxyalkyl radicals, $R_7$ represents a radical selected from the class consisting of alkyl, cycloalkyl, alkoxyalkyl and aryl radicals, $R_8$ and $R_9$ each represents a member of the class consisting of hydrogen, and alkyl, cycloalkyl, aryl, alkaryl, aralkyl and alkoxyalkyl radicals, and $R_{10}$ has the same meaning as $R_5$ and $R_6$, the ingredients of (1) and (2) being present in the aforementioned mixture in the ratio of from 0.1 to 40 molar percent of the former to from 99.9 to 60 molar percent of the latter.

13. A composition comprising a linear copolymer which is the product of polymerization of a mixture of copolymerizable ingredients including (1) diallyldimethylammonium chloride and (2) acrylamide, the ingredients of (1) and (2) being present in the aforementioned mixture in the ratio of from 0.1 to 40 molar percent of the former to from 99.9 to 60 molar percent of the latter, the diallyldimethylammonium chloride of (1) being the only quaternary ammonium copolymerizable ingredient which is present in the aforesaid mixture.

References Cited in the file of this patent
UNITED STATES PATENTS

| | | |
|---|---|---|
| 2,617,781 | Lytton | Nov. 11, 1952 |
| 2,654,729 | Price | Oct. 6, 1953 |
| 2,687,382 | Butler et al. | Aug. 24, 1954 |

UNITED STATES PATENT OFFICE
CERTIFICATE OF CORRECTION

Patent No. 2,923,701            February 2, 1960

Walter H. Schuller et al.

It is hereby certified that error appears in the printed specification of the above numbered patent requiring correction and that the said Letters Patent should read as corrected below.

Column 1, line 24, for "obtaned" read -- obtained --; line 39, for "Y-" read -- $Y^-$ --; line 57, after "sulfate" insert a comma; column 4, line 17, before "amorphous" insert -- an --; column 12, lines 25 and 30, for "acylonitrile", each occurrence, read -- acrylonitrile --; column 13, line 8, for "methylacrylate" read -- methyl acrylate --; column 15, line 51, for "coplymer" read -- copolymer --.

Signed and sealed this 16th day of August 1960.

(SEAL)
Attest:

KARL H. AXLINE            ROBERT C. WATSON
Attesting Officer           Commissioner of Patents